United States Patent [19]

Szabo

[11] Patent Number: 5,410,753
[45] Date of Patent: Apr. 25, 1995

[54] MOBILE TEST SET FOR A MOBILE-RADIO SYSTEM

[76] Inventor: Laszlo Szabo, Tubizer Strasse 11, 7015 Korntal, Germany

[21] Appl. No.: 19,697

[22] Filed: Feb. 19, 1993

[30] Foreign Application Priority Data

Feb. 21, 1992 [DE] Germany ............... 42 05 239.4

[51] Int. Cl.$^6$ ............................................. H04B 17/00
[52] U.S. Cl. .................... 455/67.4; 455/88; 455/92
[58] Field of Search ............ 455/67.1, 67.4, 67.5, 455/9, 33.1, 49.1, 53.1, 54.1, 69, 70, 88, 92, 151.2, 151.1, 67.3, 68, 45; 379/27, 63, 59

[56] References Cited

U.S. PATENT DOCUMENTS 5,134,643  7/1982  Iwata .................................. 379/26

FOREIGN PATENT DOCUMENTS

| 3140960 | 5/1983 | Germany . | |
|---|---|---|---|
| 0109441 | 7/1982 | Japan | 455/67.4 |
| 0293022 | 11/1989 | Japan | 455/67.1 |
| 0134929 | 5/1990 | Japan | 455/67.4 |
| 1412643 | 11/1975 | United Kingdom . | |
| 2243055 | 10/1991 | United Kingdom | 455/67.4 |
| 2255881 | 11/1992 | United Kingdom | 455/67.4 |
| WO91/19364 | 12/1991 | WIPO . | |
| WO91/19365 | 12/1991 | WIPO . | |
| WO91/19366 | 12/1991 | WIPO . | |
| WO91/1193-63 | 12/1991 | WIPO . | |

OTHER PUBLICATIONS

"Funkschau", Journal No. 25, 1991 p. 96, date 1991.

*Primary Examiner*—Reinhard J. Eisenzopf
*Assistant Examiner*—Nguyen Vo

[57] ABSTRACT

A mobile test set for testing a mobile-radio system containing system components to be tested and at least one operation and maintenance center. The mobile test set has a first interface for the exchange of test signals between the mobile test set and at least one of the system components and a second interface for the exchange of control signals between the mobile test set and at least one man-machine interface. The two interfaces are linked so that the exchange of the control signals takes place via at least one of the system components between the mobile test set and at least one man-machine interface installed in the operation and maintenance center.

4 Claims, 1 Drawing Sheet

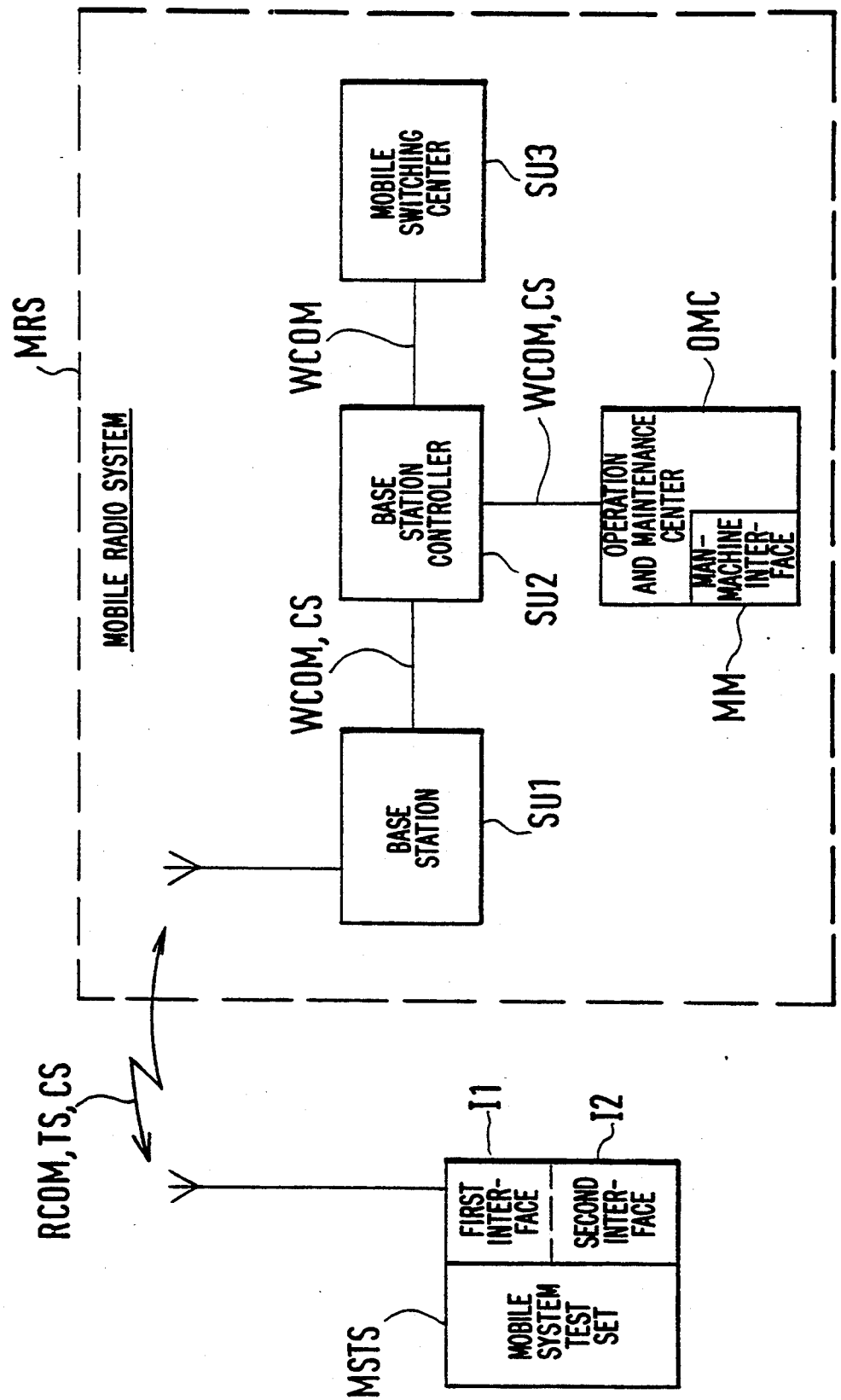

MOBILE TEST SET FOR A MOBILE-RADIO SYSTEM

BACKGROUND OF THE INVENTION

1. Field of The Invention

The present invention relates to a mobile test set for a mobile radio system containing system components to be tested and at least one operation and maintenance center.

2. Background Information

To check the operation of a given mobile-radio system (e.g., in the case of a very large number of subscribers, high changing traffic volume, or many coverage areas with greatly differing transmission conditions), various means are known.

These are test sets or complex testing means, such as the test station illustrated on page 96 of the journal "Funkschau", No. 25, 1991. This test station is obtained if the D-network test set of Alcatel SEL is used "together with a laptop, a terminal, and a man-machine interface".

The test set includes an interface for coupling it via a test link to the mobile-radio system, and a further interface for coupling it to means (such as the above-mentioned laptop) for operating the test set on-site by skilled personnel (experts).

The test link is, for example, a radio link between the test set and a base station as specified in the GSM standard (GSM: Groupe Special Mobile, a working group of the CEPT for pan-European mobile radio, established in 1982), or a standardized PCM30 transmission link for coupling the test set to a base station controller to be tested. The link between the test set and the laptop installed at the operator's position is designed to conform, for example, to the V.24 standard. The entire test station, i.e., the test set together with the operator's position, is mobile and, thus, usable at different locations within the mobile-radio system.

SUMMARY OF THE INVENTION

It is the object of the invention to design the mobile test set so that the need for the additional equipment and personnel hitherto required to set up a mobile test station is eliminated.

This object is attained by providing a mobile test set having a first interface for the exchange of test signals and a second interface for the exchange of control signals wherein the two interfaces are linked so the exchange of control signals takes place by at least one system component between the test set and at least one man-machine interface according to the teaching of claim 1.

According to the invention, provision is made for an exchange of control signals by means of the existing interfaces, so that the mobile test set can be operated from an operation and maintenance center of the mobile-radio system. This eliminates the need to operate the mobile test set at its location, since this can be done by technical means and by personnel of the respective operation and maintenance center.

As the individual operation and maintenance centers, because of their monitoring and control tasks in the mobile-radio system, generally include the means necessary to control the mobile test set, such as computer, terminal, and system experts, use of the mobile test set is made possible without the need for additional equipment and personnel.

Further advantageous features of the invention are described below.

According to an embodiment of the invention, the exchange of control signals takes place via communication links which are already present in the given mobile-radio system and conform to a given standard, such as PCM30. These links may be both radio and wire communication links. The control signals are transmitted, for example, over time or frequency channels installed in these links. Accordingly, it is not necessary to provide any additional, i.e. new, links, but use is made of existing means and transmission capacities.

According to another embodiment of the invention, the two interfaces together form a new single interface which conforms to a standard (e.g., the Abis interface specified in the GSM standard) and thus facilitates the use of the mobile test set in different mobile-radio systems provided that these systems include system components with the above standard interfaces.

BRIEF DESCRIPTION OF THE DRAWING

The invention will become more apparent by reference to the following description of a specific embodiment taken in conjunction with the accompanying drawing.

The single FIGURE of the drawing shows a possible configuration of system components SUx of a given mobile-radio system MRS and a mobile system test set MSTS.

DETAILED DESCRIPTION OFT HE PREFERRED EMBODIMENTS

The given mobile-radio system contains an operation and maintenance center OMC with a built-in man-machine interface MM, various system components (e.g. base station SU1, base station controller SU2, mobile switching center SU3), and existing links xCOM, with the link RCOM between the mobile test set and the base station representing e.g. a TDMA radio link with eight time-slot channels as specified in the GSM standard, and the other links WCOM representing PCM30 wire transmission links.

The mobile system test set MSTS includes a first interface I1 for coupling it to the base station SU1 via a radio link RCOM and, as in the prior art, for the exchange of test signals TS, which serve here to check the operation of the base station SU1. By the mobile system test set MSTS, the use of mobile stations is simulated, for example. Accordingly, the test signals TS correspond to the transmitted and received signals of at least one mobile station. By suitably shaping the transmitted signals, the mobile system test set MSTS can represent many radio-engineering problem situations, such as fading, multipath propagation, Doppler effect, and handoff.

The control signals CS necessary to operate the mobile system test set MSTS are routed through a second interface I2 which, as in the prior art, can be used to couple the test set MSTS to an on-site man-machine interface MM (exchange of control signals with local operator's position, such as by a laptop).

According to the invention, the second interface I2 is linked with the first interface I1 in such a way that the control signals CS are exchanged between the man-machine interface MM within the operation and maintenance center OMC and the mobile system test set MSTS for operation of the same. The linking of the two interfaces I1, I2 can be achieved, for example, by installing common interchange points (ports) or by providing for internal bidirectional protocol transfer.

In the illustrated embodiment, the control signals CS are transmitted over the existing links (i.e., the TDMA radio link and two PCM30 transmission links in the mobile-radio system).

The radio link RCOM is used here to transmit the test signals TS and the control signals CS. Consequently, the two linked interfaces I1, I2 form a single interface which is designed here as a GSM-standardized air interface. The test signals TS and control signals CS are transmitted in different TDMA time channels.

Two existing PCM30 transmission links WCOM in the mobile-radio system, by being provided with at least one control channel, convey the control signals which permit operation of the mobile system test set MSTS from the operation and maintenance center. Information data, particularly measured data and test results from the base station, are also transmitted over these links in corresponding channels.

By remote control of the mobile system test set MSTS, the mobile-radio system MRS and system components of the same (here base station SU1, for example) can be tested fully and exclusively from the operation and maintenance center OMC.

If links already present in the mobile-radio system MRS are used for this purpose, it is not necessary to install additional links, in the test system as shown.

In test configurations other than that of the illustrated embodiment, the first interface I1 can serve to exchange test signals over wire. In that case, the control of one or more base stations is simulated and checked, e.g., by PCM30 coupling of the mobile test system set MSTS to a base station controller to be tested. A combination of the two interfaces into I1, I2 a single standardized Abis interface permits simple and fast coupling to all system components having a corresponding standardized interface.

I claim:

1. A mobile test set for a mobile-radio system containing system components to be tested and at least one operation and maintenance center, the mobile test set comprising:
   a first interface for the exchange of test signals between the mobile test set and at least one of the system components and a second interface for the exchange of control signals between the mobile test set and at least one man-machine interface installed in the operation and maintenance center, and
   means for linking the first and second interfaces to provide for the exchange of the control signals through said at least one of the system components between the mobile test set and the at least one man-machine interface installed in the operation and maintenance center.

2. A mobile test set as claimed in claim 1, wherein the mobile-radio system includes standardized communications links and wherein the exchange of the control signals takes place through the standardized communications links of the mobile-radio system.

3. A mobile test set as claimed in claim 1, wherein the first and second interfaces together form a standard interface for the exchange of the test and control signals.

4. A mobile test set as claimed in claim 2, wherein the standardized communications links comprise:
   a radio link between the mobile test set and said at least one of the system components of the mobile radio system, the radio link including at least a channel for the control signals and a channel for the test signals, and
   at least one communications link between the system components of the mobile radio system, the at least one communications link having at least one control channel for the control signals,
   wherein the mobile test set is controlled to test the mobile radio system by remote control over the standardized communications links.

* * * * *

UNITED STATES PATENT AND TRADEMARK OFFICE
CERTIFICATE OF CORRECTION

PATENT NO. : 5,410,753
DATED : April 25, 1995
INVENTOR(S) : Laszlo SZABO

It is certified that error appears in the above-indentified patent and that said Letters Patent is hereby corrected as shown below:

Title page, col. 2, under OTHER PUBLICATIONS
The "Attorney, Agent, or Firm" information is missing from the patent. Please insert the following:

--Attorney, Agent, or Firm-SPENCER, FRANK & SCHNEIDER--.

Title page, item [75],
The Assignee is also missing from the patent document. Please insert the following:

--Assignee: ALCATEL N.V., Amsterdam, The Netherlands--.

Signed and Sealed this

Twentieth Day of June, 1995

Attest:

BRUCE LEHMAN

Attesting Officer     Commissioner of Patents and Trademarks